US012783144B2

(12) United States Patent
Buchman et al.

(10) Patent No.: US 12,783,144 B2
(45) Date of Patent: Nov. 3, 2026

(54) DATA MIGRATION USING AN ORCHESTRATOR GENERATED DATA MIGRATION TRANSCRIPT AND SECURITY VOUCHERS

(71) Applicant: Dell Products L.P., Round Rock, TX (US)

(72) Inventors: Ophir Jehoshua Buchman, Raanana (IL); Yevgeni Gehtman, Modi'in (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 19/098,369

(22) Filed: Apr. 2, 2025

(65) Prior Publication Data

US 2026/0310369 A1 Oct. 8, 2026

(51) Int. Cl.
*G06F 3/06* (2006.01)
*G06F 21/60* (2013.01)

(52) U.S. Cl.
CPC .......... *G06F 3/0647* (2013.01); *G06F 3/0622* (2013.01); *G06F 3/0679* (2013.01); *G06F 21/60* (2013.01); *G06F 21/602* (2013.01)

(58) Field of Classification Search
None
See application file for complete search history.

(56) References Cited

U.S. PATENT DOCUMENTS 9,282,166 B2 3/2016 Markley et al.
9,317,223 B2 4/2016 Reohr et al.
9,612,767 B2 4/2017 Huang et al.
9,742,873 B2 8/2017 Ananthanarayanan et al.
10,249,014 B2 4/2019 Bala et al.
10,382,408 B1 * 8/2019 Ahmed ................. G06F 21/606
10,601,665 B2 3/2020 Bathen et al.
10,713,097 B2 7/2020 Asthana et al.
11,068,389 B2 7/2021 Gao et al.
(Continued)

FOREIGN PATENT DOCUMENTS

CN 120371807 A 7/2025
WO 2024137177 A1 6/2024

OTHER PUBLICATIONS

Gil Trotino. (Oct. 27, 2024). "How to Build a Data Migration Plan: A Step-by-Step Tutorial", K2VIEW Blog. Retrieved from <https://www.k2view.com/blog/data-migration-plan/> on Apr. 1, 2025 (3 pages).

(Continued)

*Primary Examiner* — Yaima Rigol
(74) *Attorney, Agent, or Firm* — WOMBLE BOND DICKINSON (US) LLP

(57) ABSTRACT

Methods and systems for migrating data between provider systems are disclosed. The migration may be performed using a migration orchestrator as-a-service (MOaaS) schema where instances of a migration orchestrator that is configured at a data source (e.g., a source provider system) are instantiated on systems of all other actors/personas involved with the data migration. The instances of the migration orchestrator may cooperatively fulfill the migration of the data using a shared data migration transcript. Security vouchers containing share secrets may also be used to enhance security during migrations.

20 Claims, 9 Drawing Sheets

(56) References Cited

U.S. PATENT DOCUMENTS

| | | | | |
|---|---|---|---|---|
| 11,122,130 | B1 | 9/2021 | Kumar | |
| 11,422,971 | B2 | 8/2022 | Yamaguchi | |
| 12,028,343 | B2 | 7/2024 | Todd et al. | |
| 12,067,271 | B2 | 8/2024 | Ciudad et al. | |
| 2009/0154709 | A1 * | 6/2009 | Ellison | H04L 9/0877 380/282 |
| 2016/0191623 | A1 | 6/2016 | Vasudevan | |
| 2017/0288971 | A1 | 10/2017 | Jayaraman | |
| 2018/0351940 | A1 | 12/2018 | Dennis | |
| 2019/0250946 | A1 | 8/2019 | Parameshwaran | |
| 2020/0004582 | A1 | 1/2020 | Fornash | |
| 2020/0012625 | A1 | 1/2020 | Nelluri | |
| 2020/0104375 | A1 | 4/2020 | Earnesty, Jr. | |
| 2020/0133706 | A1 | 4/2020 | Koehler | |
| 2020/0412767 | A1 | 12/2020 | Crabtree | |
| 2022/0164207 | A1 | 5/2022 | Velammal | |
| 2022/0164223 | A1 | 5/2022 | Llamas Virgen | |
| 2022/0171699 | A1 | 6/2022 | Velammal | |
| 2022/0215469 | A1 | 7/2022 | Jette | |
| 2022/0413943 | A1 | 12/2022 | Poornachandran | |
| 2023/0246818 | A1 * | 8/2023 | Peddada | H04L 9/0861 713/171 |
| 2024/0012693 | A1 | 1/2024 | Jigalur | |
| 2024/0394231 | A1 | 11/2024 | Fisher | |
| 2024/0427743 | A1 | 12/2024 | Anusuri | |
| 2025/0110931 | A1 | 4/2025 | Ledenyov | |
| 2026/0005839 | A1 | 1/2026 | Thomas | |

OTHER PUBLICATIONS

AWS. (n.d.). “What is Data Migration?”. Amazon Web Services, Inc., retrieved from <https://aws.amazon.com/what-is/data-migration/#:~:text=The%20goal%20of%20data%20migration,and%20time%20and%20transfer%20methods> on Apr. 1, 2025 (5 pages).

* cited by examiner

DATA MIGRATION USING AN ORCHESTRATOR GENERATED DATA MIGRATION TRANSCRIPT AND SECURITY VOUCHERS

FIELD

Embodiments disclosed herein relate generally to migration of user data between service provider systems. More particularly, embodiments disclosed herein relate to systems and methods for managing migration of user (e.g., customer) data from the user's current service provider's system to a new service provider's system.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

embodiments.

Figure 3:
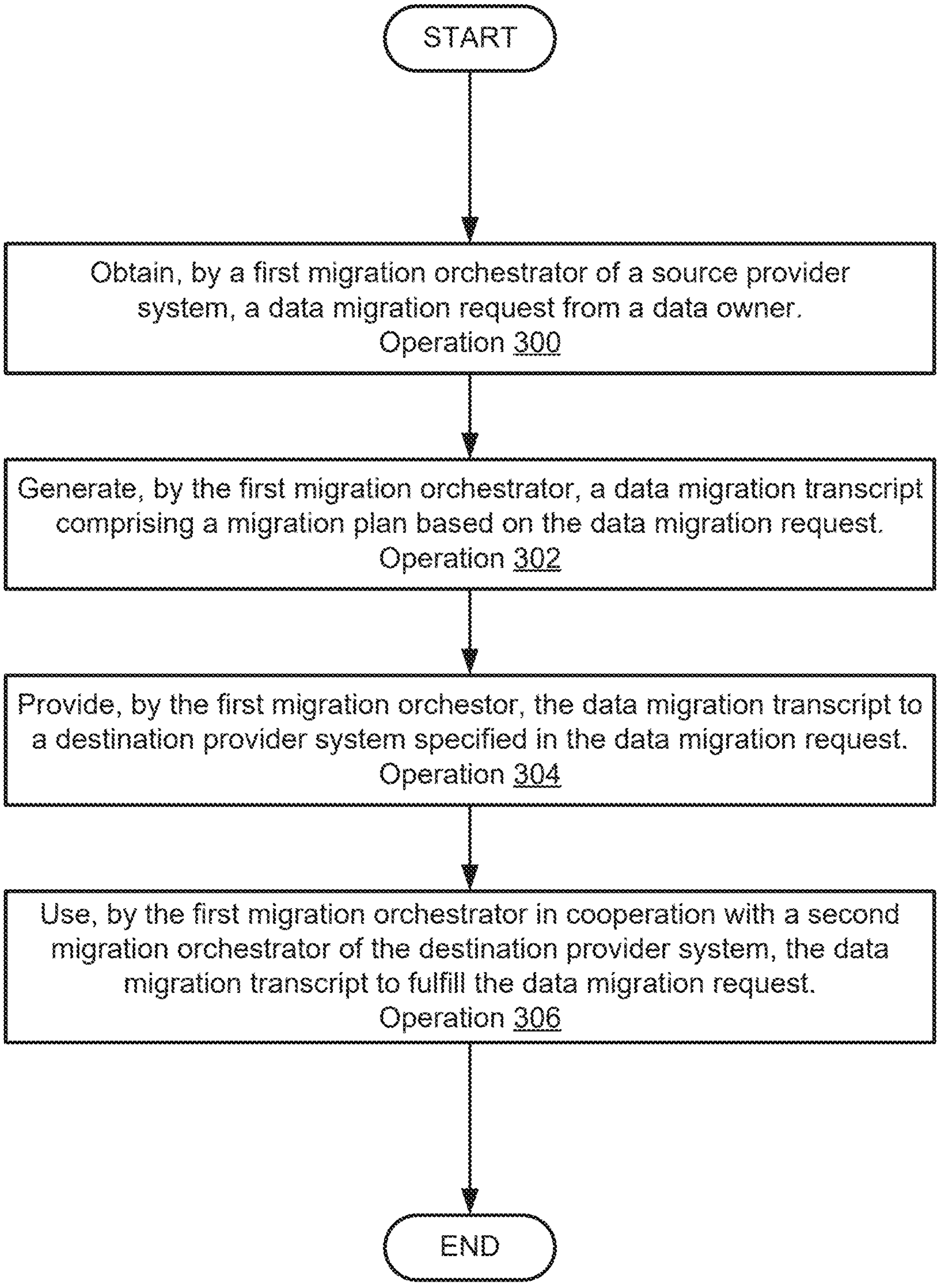

FIG. 3 shows a flowchart in accordance with one or more embodiments.

Figure 4:
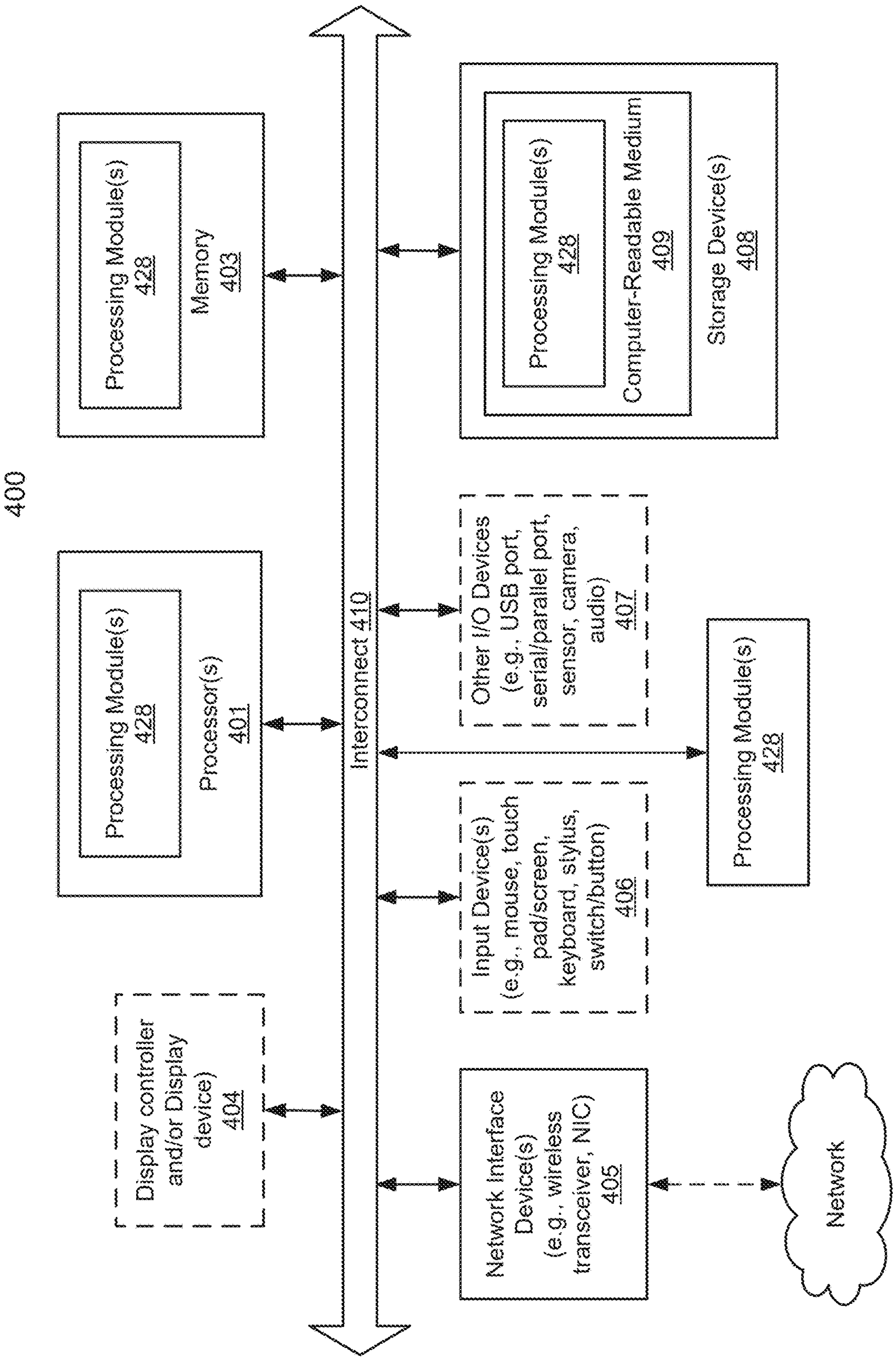

FIG. 4 shows a block diagram illustrating a computing device in accordance with one or more embodiments.

Figure 5A:
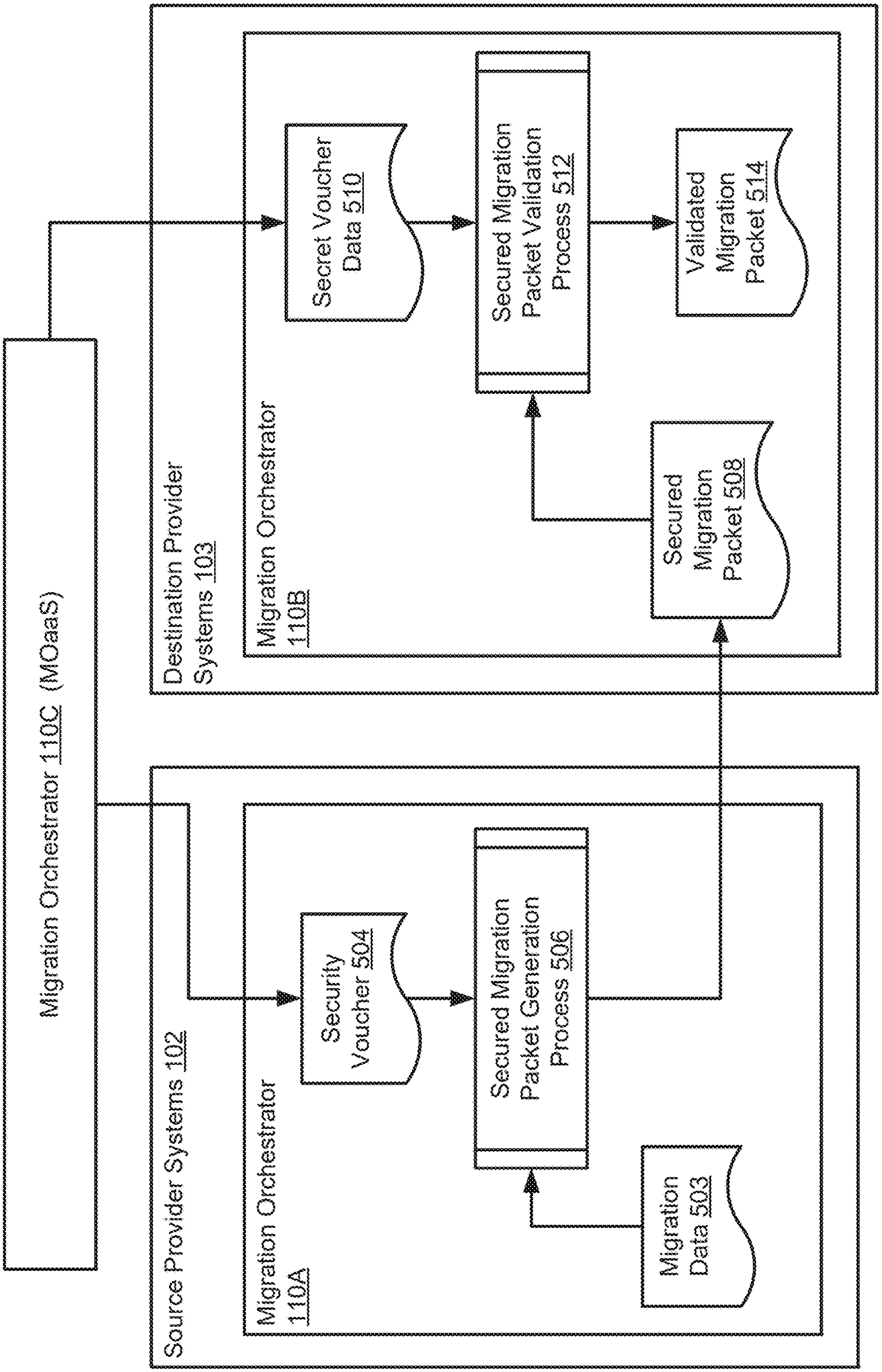

FIG. 5A shows a data flow diagram in accordance with one or more embodiments.

Figure 5B:
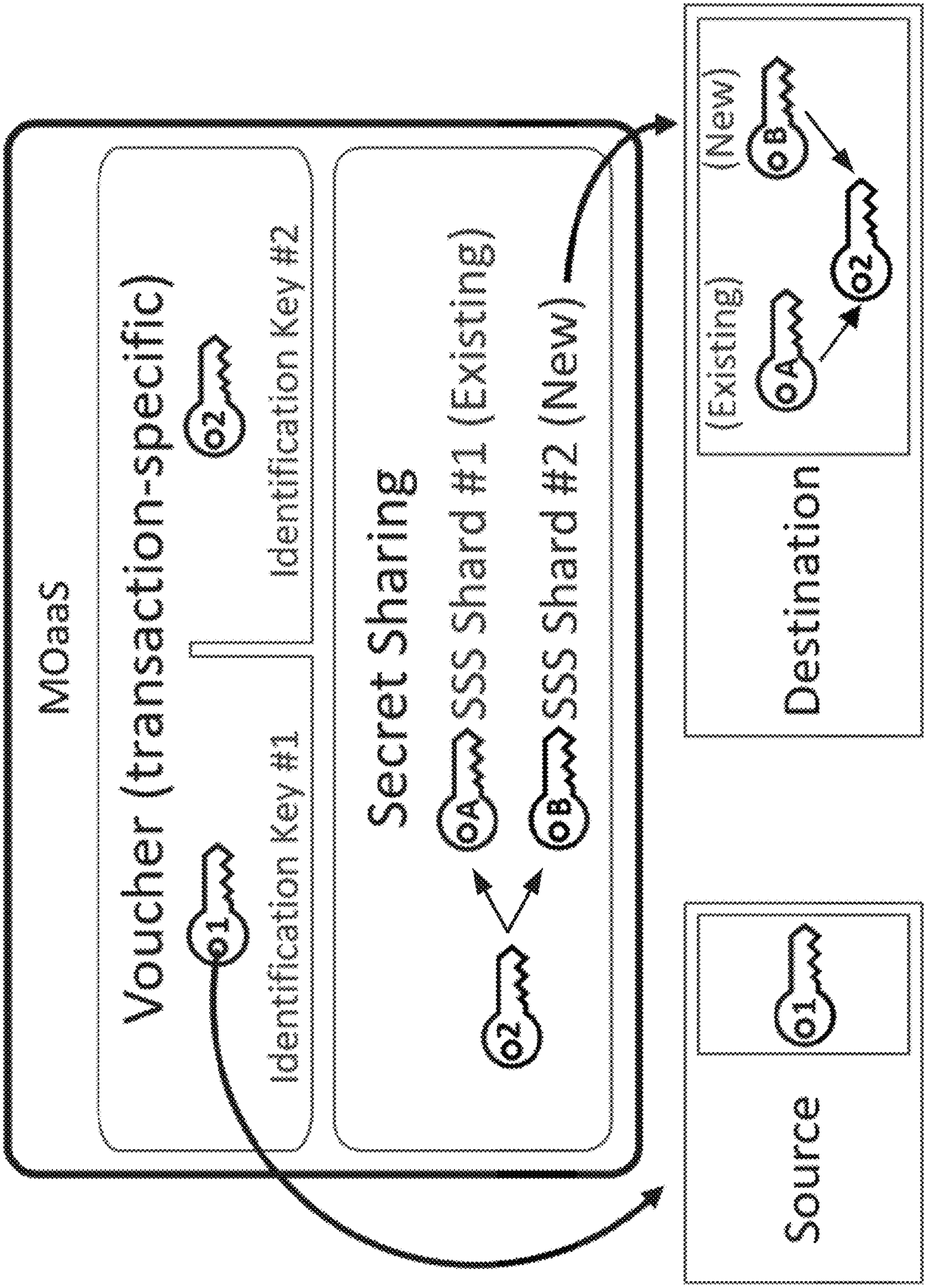

FIG. 5B shows an implementation example in accordance with one or more embodiments.

Figure 6:
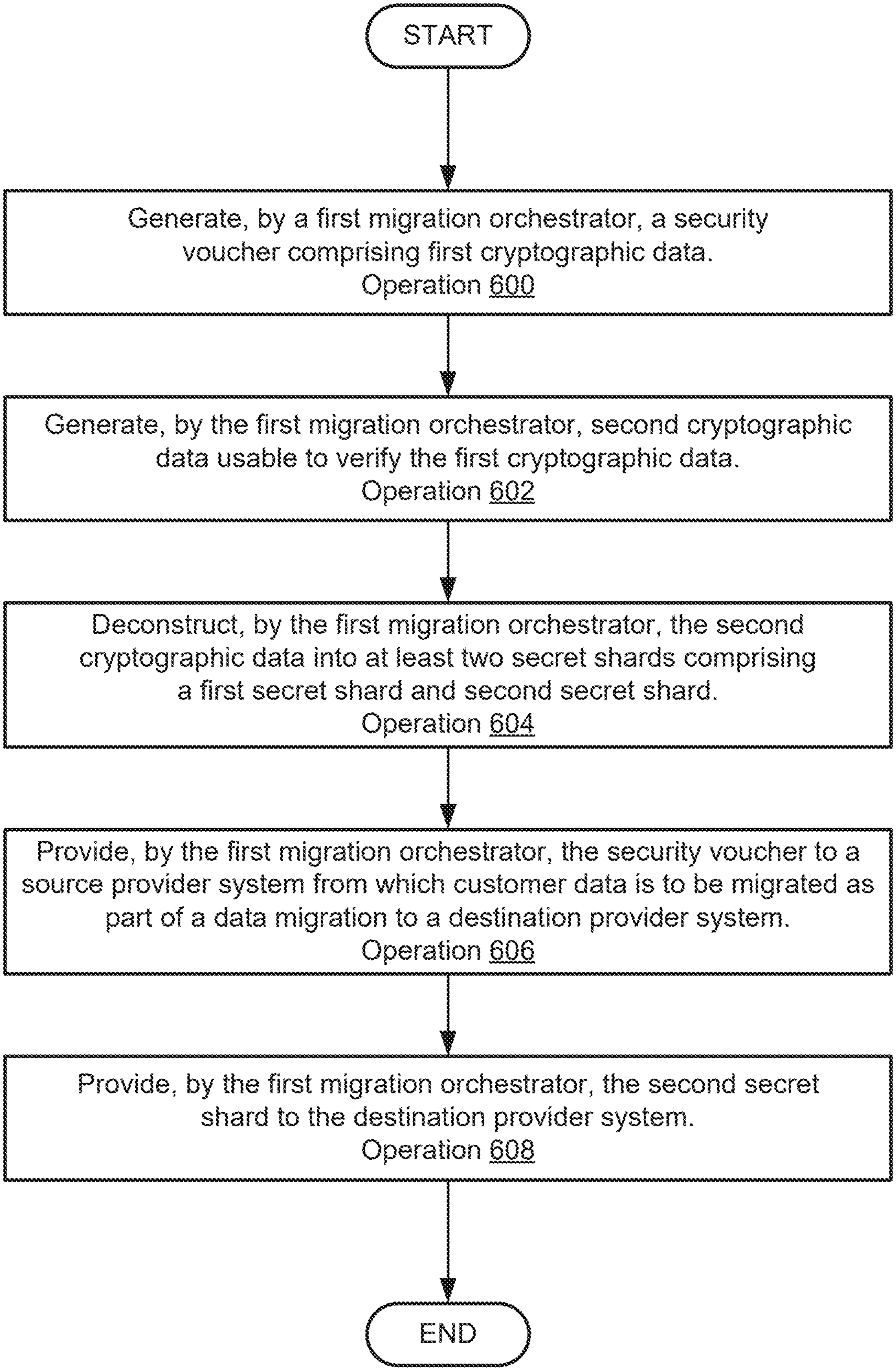

FIG. 6 shows a flowchart in accordance with one or more embodiments.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the migration of data between provider systems (e.g., computing devices, as described below in reference to FIG. 4).

In particular, as technology advances, more and more user activities and information (e.g., files, documents, records, or the like) are becoming digital. This creates issues and challenges in the management and accessibility of such digital information.

To address these issues and challenges, various legislative and government entities have enacted data privacy laws and data regulations to not only protect data but also create an environment that fosters fair competition (e.g., between businesses). For example, the European Union (EU) Data Act is a legislative proposal by the EU designed to regulate and facilitate the use, sharing, and management of non-personal data across sectors. All provisions of the EU Data Act will become applicable on Sep. 12, 2025, with the EU Data Act aiming to empower consumers and businesses by ensuring fair access to data and fostering a more competitive digital market. The EU Data Act covers data generated by devices, services, and applications, emphasizing the importance of interoperability, data portability, and fair contracts between data holders and users.

According to EU Data Act article 25, a customer is allowed, upon request, to switch to a data processing service (e.g., data storage, data management, data transformation services, or the like) offered by a different provider or to port all exportable data and digital assets to an on-premises information and communication technology (ICT) infrastructure. However, the current landscape of data processing service migration already faces multitudes of challenges such as lack of standardized processes and compliance mechanisms, making such data service (e.g., data processing service) migrations complex, time-consuming, and fraught with risks related to data integrity, security, and regulatory adherence. The introduction of article 25 of the EU Data Act set forth new legal challenges that in turn results in additional technological challenges in ensuring compliant and seamless data migrations across data service provider environments (e.g., cloud environments, on-prem environments, or the like). Such additional technological challenges detrimentally expose users to potential legal, operation, and security vulnerabilities during the data migration process, which presents new technical problems (induced by the enactment of the EU Data Act) that require unconventional technical solutions.

In view of this need for unconventional technical solutions to solve such new technical problems associated with newly introduced legal restrictions (e.g., the EU Data Act, or the like), embodiments disclosed herein provide an improved framework for orchestrating a seamless migration of data and data services between data service providers while also being fully compliant with these newly introduced legal restrictions.

In particular, embodiments disclosed herein provide migration orchestration-as-a-service (MOaaS) organized and managed by a migration orchestrator. The migration orchestrator may be configured by a source provider (i.e., a user's current data service/data provider) and may be embedded with all regulations and policies associated with one or more enacted data privacy and/or data sharing laws.

In embodiments, the migration orchestrator may cause systems (e.g., computing devices) of a user chosen data service provider (i.e., a destination provider) to which the user's data and/or data services will be migrated to forcibly conform to known legal restrictions and policies (i.e., the EU Data Act). Such forced compliance may be done with or without consent (e.g., digital validation and/or security checks) by the destination provider system. For example, the migration orchestrator may provide (e.g., securely transmit, forcibly inject, or the like) instructions in the form of deployable executing software or the like to the destination provider systems that will cause the destination provider systems to instantiate (e.g., create, execute, run, or the like) an instance of the migration orchestrator.

Instances of the migration orchestrator (i.e., on the source and destination provider systems) may then cooperatively follow one or more structure plans (e.g., data migration transcripts that will be discussed in more detail below, or the like) to complete the data migration in a seamless manner that is also compliant with any known legal restrictions and/or policies. Additional details associated with the migration orchestrator are discussed below in reference to FIGS. 1A-6.

As a result, embodiments disclosed herein provide an improvement over current existing data migration frameworks and mechanisms that are not designed in view of legal and/or other non-technological restrictions, limitations, and/or policies (e.g., current data migration frameworks and mechanisms that are not designed in view of the EU Data Act, or the like). Said another way, embodiments disclosed herein present an unconventional technical solution to address a technical problem created by newly introduced legal restrictions and regulations.

Other advantages, improvements to various computer-related technologies and improvements to computer functionalities (e.g., associated with the use of the data migration transcript or the like of embodiments disclosed herein) will be apparent below as more details regarding embodiment disclosed herein are described in reference to the figures (e.g., FIGS. 1A-6).

In an embodiment, a method for migrating data between provider systems is provided. The method may include: obtaining, by a first migration orchestrator of a source provider system, migration feedback and statistics associated with a migration of customer data from the source provider system to a destination provider system; determining, by the first migration orchestrator and using the migration feedback and statistics, that one or more migration phases of the migration can be improved; dynamically updating, by the first migration orchestrator and based on the determination, at least one of the one or more migration phases and at least one migration phase template associated with the at least one of the one or more migration phases, the at least one migration phase template being stored by the source provider system, and the at least one of the one or more migration phases being specified in a data migration transcript used by the source provider system and the destination provider system to fulfill the migration of the customer data; and using, by the first migration orchestrator, the at least one of the one or more migration phases, the at least one migration phase template associated with the at least one of the one or more migration phases, and the data migration transcript to obtain an updated data migration transcript, the updated data migration transcript to be used for the migration or for future migrations associated with the source provider system.

The determination that that the one or more migration phases of the migration can be improved is based on a detection of a negative sentiment, by the first migration orchestrator, within at least one feedback within the migration feedback and statistics.

Dynamically updating the at least one of the one or more migration phases and the at least one migration phase template associated with the at least one of the one or more migration phases comprises at least removing the at least one of the one or more migration phases from the data migration transcript to obtain the updated data migration transcript.

The migration of the customer data from the source provider system to a destination provider system comprises: generating, by a first migration orchestrator, a security voucher comprising first cryptographic data; generating, by the first migration orchestrator, second cryptographic data usable to verify the first cryptographic data; deconstructing, by the first migration orchestrator, the second cryptographic data into at least two secret shards comprising a first secret shard and second secret shard; providing, by the first migration orchestrator, the security voucher to a source provider system from which customer data is to be migrated as part of a data migration to a destination provider system along with instructions for the source provider system to secure migration data to be transferred to destination providers as part of the data migration, the migration data comprising data identical to the first secret shard; and providing, by the first migration orchestrator, the second secret shard to the destination provider system with first instructions for the destination provider system to reconstruct the second cryptographic data using the second secret shard and the migration data and second instructions for the destination provider system to use a reconstructed one of the second cryptographic data to verify the migration data.

Verifying the migration data comprises verifying the second cryptographic data against the first cryptographic data used to secure the migration data.

Securing the migration data comprises encrypting the migration data using the first cryptographic data and verifying the migration data comprises using the second cryptographic data to decrypt the migration data that is encrypted using the first cryptographic data.

The first cryptographic data and the second cryptographic data are identification keys.

The at least two secret shards are generated based on a Shamir Secret Sharing (SSS) protocol.

The data migration is generated based on a data migration transcript generated for the data migration, and the first migration orchestrator cooperatively performs the data migration along with a second migration orchestrator of the source provider system and a third migration orchestrator of the destination provider system using the data migration transcript as a guideline for the data migration.

The first migration orchestrator manages and controls operations of the second migration orchestrator and the third migration orchestrator.

A non-transitory media may include instructions that when executed by at least a processor of a data processing system cause the computer-implemented method to be performed by the data processing system.

A data processing system may include the non-transitory media and a processor, and may perform the computer-implemented method when processor executes the instructions in the non-transitory media.

Figure 1A:
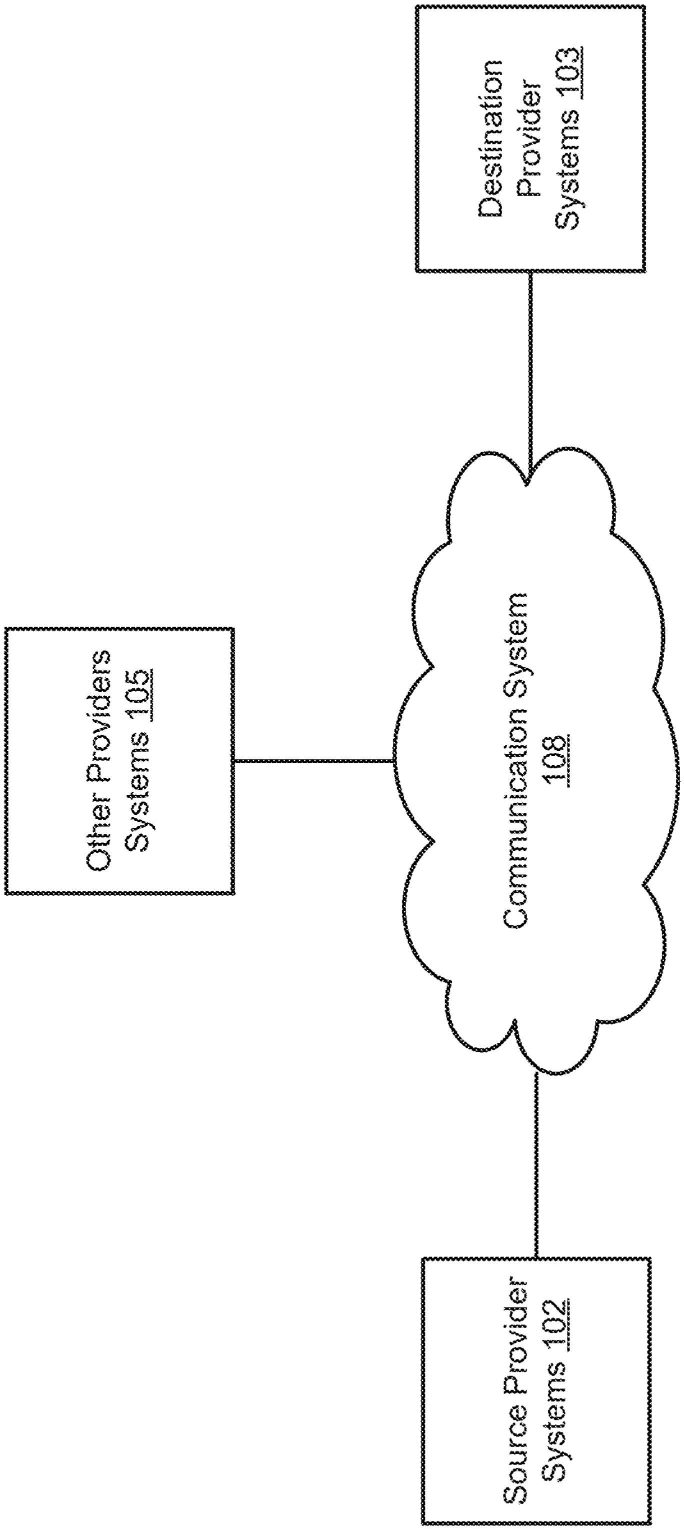
FIG. 1A shows a block diagram illustrating a system in accordance with one or more embodiments.

Turning to FIG. 1A, a block diagram illustrating a system in accordance with an embodiment is shown. The system shown in FIG. 1A may provide computer implemented services. The computer implemented services may include any type and quantity of computer implemented services. For example, the computer implemented services may include data storage services, data processing and transformation services, data generation services, instant messaging services, database services, AI/ML services, data migration services, and/or any other type of service that may be implemented with a computing device (e.g., the example computing device of FIG. 4 or the like).

To provide the above noted functionality, the system of FIG. 1A may include source provider systems 102 (also referred to herein as simply "source provider system"), destination provider systems 103 (also referred to herein as simply "destination provider system"), and other provider systems 105 (also referred to herein simply as "other provider's system" and/or "another provider's system"). Each of these provider systems (i.e., 102, 103, 105) may be made up of and include any number of data processing systems (e.g., the example computing device of FIG. 4 or the like) (not shown in FIG. 1A). Said another way, each of these provider systems (i.e., 102, 103, 105) may be made up of any number and combination of computing systems that are required for these provider systems to provide the computer implemented services each respective provider advertises to users (e.g., consumers of these providers).

Each data processing system making up the collection (e.g., one or more) data processing systems of each of the provider systems (i.e., 102, 103, 105) may be a node within a computing environment set up for each provider system (i.e., 102, 103, 105). One or more nodes may then be combined and/or arranged into one or more clusters (e.g., one or more groups of data processing systems), each of which having at least one of the nodes. Additionally, data processing systems may provide the computer implemented services to users of data processing systems and/or to other devices (not shown). Different data processing systems may provide similar and/or different computer implemented services.

To provide the computer implemented services, data processing systems may include various hardware components (e.g., various types of processors, memory modules, storage devices, etc.) and host various software components (e.g., operating systems, application, machine learning model, startup managers such as basic input-output systems, etc.). These hardware and software components (discussed in more detail below in FIG. 1B) may provide the computer implemented services via their operation.

The software components may be implemented using various types of services. For example, each data processing system of the data processing systems may host various services that provide the computer implemented service (e.g., application services, data anonymization services, data verification services, or the like) and/or that manage the operation of these services (e.g., management services). The aggregate (e.g., combination) of the management and application services may be a complete service that provide desired functionalities.

In embodiments, the source provider systems 102 may be associated with a current data service/data provider (referred to herein collectively as "data provider") of a user. Destination provider systems 103 may be associated with a data provider to which the user wishes to switch (e.g., transition) from the user's current data provider. Said another way, from a data migration standpoint, the user's data is currently stored at source provider systems 102 and will be migrated to destination provider systems 103.

In embodiments, other provider systems 105 may be associated with third-party services (e.g., vendors of one, both, or none of the source provider systems 102 and destination provider systems 103, independent vendors/contractors hired directly by the user, or the like). Such other provider systems 105 may also hold part of the user's data that is to be migrated to destination provider systems 103. Such other provider systems 105 may also provide other services (e.g., trustee services, conflict resolution services, security services, or the like) that would further aid in the integrity, security, and regulatory adherence of the data as the data (i.e., user data) is migrated from source provider systems 102 to destination provider systems 103. Even further, the data being migrated from source provider systems 102 may first be transmitted to one or more of the other provider systems 105 to use the one or more of the other provider systems 105 as a relay point and/or to use the one or more other provider systems 105 to perform additional processes (e.g., additional encryption, decryption, deduplication, compression, format conversion, or any other processes that can be applied to the data being migrated in accordance with one or more completion and/or migration requirements associated with the migration, discussed in more detail below in reference to FIGS. 1C-2B) on the data being migrated.

As an example, assuming that a user (e.g., a customer of a data provider) wishes to exercise their rights under Article 25 of the EU Data Act to switch data processing services or migrate their data and digital assets to on-premises and Cloud infrastructure, the source provider systems 102 of FIG. 1A would be operated by the user's current data provider, the destination provider systems 103 would be operated by the data provider to which the user wishes to switch to, and the other provider systems 105 would be operated by a third-party hired by the user, the user's current data provider, and/or the user's new data provider to assist with one or more portions of the data migration process. In embodiments, multiple third-parties (e.g., multiple ones of the other provider systems 105) may be involved with migration of the user's data and/or data services from source provider systems 102 to destination provider systems 103.

Any of the components illustrated in FIG. 1A may be operably connected to each other (and/or components not illustrated) with communication system 108. In an embodiment, communication system 108 includes one or more networks that facilitate communication between any number of components (e.g., any of the computing devices associated with any of the provider systems (i.e., 102, 103, 105) to one another). The networks may include wired networks and/or wireless networks (e.g., and/or the Internet). The networks may operate in accordance with any number and types of communication protocols (e.g., such as the Internet Protocol).

In embodiments, within each provider systems (i.e., 102, 103, 105), the data processing systems may be connected via a local area network (LAN) based protocol to form an intranet setting between the data processing systems. For example, assume that destination provider systems 103 is now isolated (e.g., disconnected) from the communication system 108), such an isolated version of the destination provider systems 103 may be set up to implement the on-premises, private/local shared system environment version of embodiments disclosed herein where the data processing systems making up destination provider systems 103 are grouped together to distribute their workload capacity for more efficient use of computing resources (e.g., computer processing unit (CPU) resources, storage resources or the like), offering a local environment that is advantageously less dependent on cloud-based services for access to computing resources used to fulfill all of the workloads required to be fulfilled within destination provider systems 103.

While FIG. 1A is illustrated as including a limited number of specific components, a system in accordance with an embodiment may include fewer, additional, and/or different components than those illustrated therein.

Figure 1B:
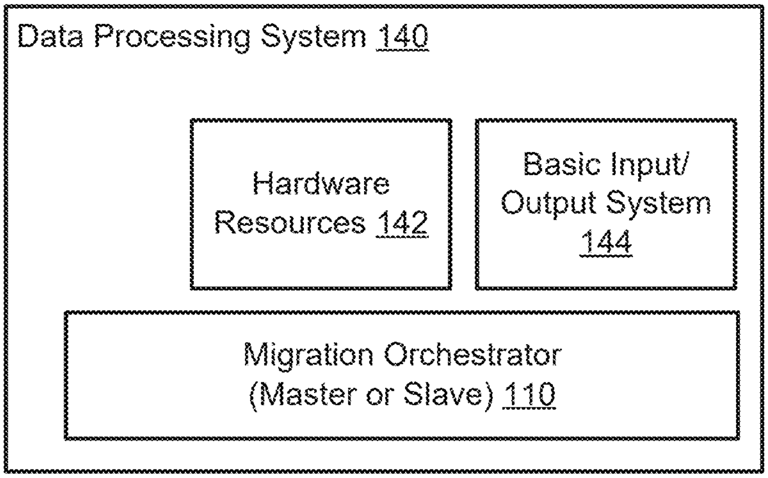
FIG. 1B shows a block diagram illustrating a data processing system in accordance with one or more embodiments.

Turning to FIG. 1B, a diagram illustrating data processing system 140 in accordance with an embodiment is shown. Data processing system 140 may be similar to any of the data processing systems and/or any other data processing system located within (e.g., making up) any of the other provider systems (i.e., 102, 103, 105) shown in FIG. 1A. For example, data processing system 140 may be a desktop computer (e.g., configured as a server or the like) that is physically installed at any one of the provider systems (i.e., 102, 103, 105) shown in FIG. 1A.

To provide computer implemented services (e.g., any of the services discussed above in reference to FIG. 1A, the processes and methods associated with embodiments disclosed herein as discussed in reference to FIGS. 2A-3 and 5A-6, or the like), data processing system 140 may include any quantity of hardware resources 142. Hardware resources 142 may include physical parts of data processing system 140 that store and run software. Hardware resources 142 may include processors (e.g., CPUs, graphical processing units (GPUs), neural processing units (NPUs), memory modules (also referred to herein as “memory devices”), storage devices, and/or other types of hardware components usable to provide computer implemented services. A basic input/output system (BIOS) 144 may be stored on the processors and memory modules.

BIOS 144 may be used to startup data processing system 140. On the startup, BIOS 144 may configure peripheral devices, such as a keyboard, mouse, monitor, etc. With the peripheral devices, BIOS 144 may configure hardware resources 142 for use by data processing system 140. BIOS 144 may also generate any of the logs (e.g., computer logs, event logs, or the like) to be stored as one or more types of telemetry data collected for the data processing system 140.

In embodiments, other types of telemetry data may include any data associated with the operation of data processing system 140. For example, performance and/or non-performance related data such as: (i) hardware and/or software component information of the data processing system 140; (ii) computing resources (e.g., CPU resources, GPU resources, memory resources, etc.) available within data processing system 140; (iii) system logs (e.g., event logs, error logs, or the like); (iv) owner information including owner identification (ID) of the data processing system 140; (iv) operating state information of the data processing system 140; (v) network latency information; (vi) network communication and data exchanges of the data processing system 140; or the like. Any other type of data not listed above that would be commonly associated with a computing device’s telemetry data could also be included without departing from embodiments disclosed herein.

Migration orchestrator 110 may be implemented using hardware, software, or a combination thereof to facilitate (e.g., manage) migration of data (e.g., user data) between various provider systems (e.g., 102, 103, 105 of FIG. 1A). Migration orchestrator 110 may perform all or part of the methods and processes disclosed herein in reference to FIGS. 2A-3 and 5A-6.

In embodiments, migration orchestrator 110 may be configured as a master instance (e.g., a main migration orchestrator with primary control over slave instances of the migration orchestrator 110) or a slave instance. In one embodiment, a master instance of the migration orchestrator 110 may be configured/provided in source provider systems 102 while destination provider systems 103 and other provider systems 105 are configured with slave instances of the migration orchestrator 110. In another embodiment, all provider systems (i.e., 102, 103, 105 of FIG. 1A) may be provided with migration orchestrators 110 with the same level of authority (i.e., there is no master-slave relationship between the provisioned migration orchestrators 110). Instances of the migration orchestrator configured (e.g., provisioned) in each provider systems (i.e., 102, 103, 105 of FIG. 1A) may work in a cooperative (e.g., with or without existence of master-slave relationship) manner to complete a migration of data from the source provider systems 102 to the destination provider systems 103.

While FIG. 1B is illustrated as including a limited number of specific components, a data processing system in accordance with an embodiment may include fewer, additional, and/or different components than those illustrated therein. For example, in addition to all of the components shown in FIG. 1B, the data processing system 140 may also include part of all of the components of the example computing device described below in reference to FIG. 4.

Figure 1C:
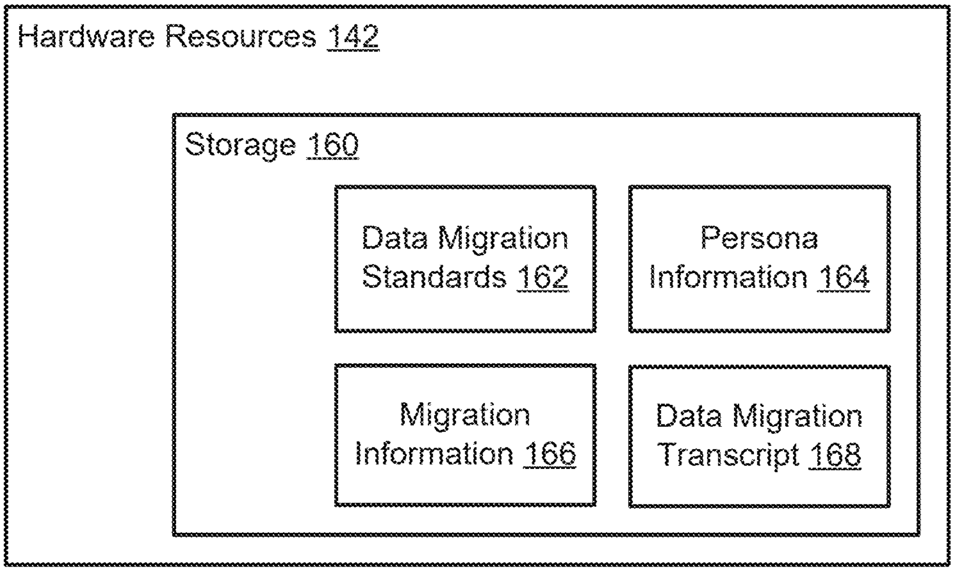
FIG. 1C shows a block diagram illustrating a storage of the data processing system of FIG. 1B in accordance with one or more embodiments.

Turning now to FIG. 1C, a diagram illustrating example hardware resources 142 of data processing system 140 in accordance with an embodiment is shown. As shown in FIG. 1C, the hardware resources 142 (in addition to those discussed in reference to FIG. 1B and FIG. 4) may include a storage 160.

Storage 160 may be implemented using any combination of storage devices (e.g., hard disk drives (HDDs), solid state drives (SSDs), volatile memory, non-volatile memory, or the like). Storage 160 may be configured to store at least data migration standards 162, persona information 164, migration information 166, and data migration transcript 168. Each of the data migration standards 162, persona information 164, migration information 166, and data migration transcript 168 may be retrieved (e.g., obtained) and managed (e.g., stored and retained within storage 160) by migration orchestrator 110 (e.g., in combination with or separately by any of the other hardware resources 142) of data processing system 140.

Data migration standards 162 may include any information associated with any restrictions (e.g., rules, guidelines, standards, or the like) and/or policies to be followed during the migration of data from source provider systems 102 to the destination provider systems 103. Such restrictions and/or policies may be associated (e.g., set) by any of the provider systems (i.e., 102, 103, 105), and may be associated with any security and/or non-security-based protocols. Such restriction and/or policies may also be based on government/legislative rules and/or guidelines (e.g., the EU Data Act, or the like). For example, a digital copy of the EU Data Regulation rulebook associated with the EU Data Act may be stored as data migration standards 162.

Persona information 164 may include any type of data and information that can be used to describe (e.g., in a technical and/or non-technical manner) all actors (e.g., personas) involved with a migration of data. For example, assuming that all provider systems (i.e., 102, 103, 105) of FIG. 1A are involved with a migration of data from source provider systems 102 to the destination provider systems 103, persona information 164 may include all identifying information associated with the source provider systems 102, the destination provider systems 103, the other provider systems 105, and a customer that initiated (or wishes to initiate) the data migration.

In one example, the persona information 164 may include the names (and/or other identification information such as geographical location, digital address (e.g., Internet Protocol address (IP address), business sector information associated with each actor/persona, or the like) of all of the source provider systems 102, the destination provider systems 103, the other provider systems 105, and the customer. The persona information 164 may also include preferences (e.g., security related preferences, non-security related preferences, data management preferences, data services preferences, or the like) associated with each and/or all of the involved actors/personas. Said another way, any type of data that can be used to better understand (from both a technical and a non-technical perspective) each actor/persona can be stored as (i.e., included in) the persona information 164 (e.g., for each respective actor/persona).

In embodiments, the persona information 164 may also include all (or at least an amount that an owner/operator of each provider systems (i.e., 102, 103, 105) is willing to reveal) information regarding the software and hardware components of the data processing systems located making each provider system's (i.e., 102, 103, 105) site. Such information may include, for example: (i) number of available processor and/or processing units; (ii) amount of available storage; (iii) network capabilities; (iv) hardware and software component identification (ID) information including version, part number, manufacturer, part ratings, part specifications, or the like: (v) number of data processing systems available for use; (vi) operating system information; (vii) available computer implemented services and the specifications and capacities of each service; (viii) available limited computing resources (e.g., processing units, storage space, network bandwidth, or the like) for use by internal and/or external (e.g., the data migration) processes; or the like. Said another way, any information that can reveal and/or paint a picture of the technical capabilities of each provider system's computing device may be included in persona information 164 without departing from the scope of embodiments disclosed herein. Such information may be included in the form of a blueprint (e.g., a technical blueprint specifying the technical/computing capabilities that each provider system (i.e., 102, 103, 105) is capable of providing). Such information may also be routinely updated as the provider systems (i.e., 102, 103, 105) update their data processing systems (e.g., install new hardware, replace old systems with new systems, software updates, addition or removal of software and/or network based services, or the like).

Migration information 166 may include any type of data and information that can be collected at any time of (e.g., before, during, and/or after) the migration of data from the source provider systems 102 to the destination provider systems 103 that would provide any entity (e.g., any of the entities discussed in FIG. 1A, a separate entity like a government official, or the like) with information necessary to understand one or more parts associated with the migration (e.g., why the migration was initiated, why were certain processes executed during the migration, what data was migrated, why data was migrated or not migrated, what restrictions and/or policies were followed, or the like).

For example, the migration information 166 may include, in part, business contracts (e.g., in the form of scanned documents, smart contracts stored in blockchain environments, non-blockchain related smart contracts that are configured to execute similar to blockchain related smart contracts, or the like) executed between the customer and any (or all) of the operators of the system providers (i.e., 102, 103, 105) of FIG. 1A. As another example, migration information 166 may also include a data type (e.g., customer-owned data, provider-owned data, co-generated data, or the like) associated with the data being, to be, or already migrated.

As yet another example, migration information may include structured phases that the migration is broken into (e.g., by the migration orchestrator 110 based on the data migration standards 162 and/or persona information, or the like). Example migration phases may include, but are not limited to: (i) a planning and assessment phase; (ii) a pre-migration preparation phase; (iii) a data migration phase; (iv) a service migration phase; (v) a test and optimization phase; (vi) a cutover and go-live phase; (vii) a post-migration tasks phase; or the like.

Each of these phases may be associated (e.g., characterized) with one or more properties/factors such as: (i) one or more entrance criteria (e.g., one or more criteria specifying what could or would cause a start of a phase such as a destination environment setup criteria, a pre-migration check criteria, or the like); (ii) an initiator (e.g., who among the involved persons will/can initiate the phase); (iii) roles for each persona during each phase; (iv) required actions by each persona (e.g., data encryption requirements, migration phase requirements, data validation and verification requirements, or the like); (v) one or more exit criteria (e.g., one or more criteria specifying what results and/or actions could or would end a phase such as a criteria requiring all necessary data successfully migrated and verified, or the like); (vi) clear deliverables denoting what is the output (e.g., result) of each phase; or any of other properties/factors based on any of the data migration standards 162 and/or persona information 164.

Other phases and/or properties/factors not listed above that could be associated with data migration by one having ordinary skill in the art in this technical field (e.g., the technical field of data processing and migration services, or the like) may also be included without departing from the scope of embodiments disclosed herein.

As yet another example, migration information 166 may include any migration related data collected (e.g., obtained) by any of the provider systems (i.e., 102, 103, 105) during the migration of the data that could be used to better understand the migration process (e.g., what happened during the migration). For example, the duration of the migration, the speed at which data was exchanged, any network latencies experienced, lost data packets, and/or any other events and/or activities that could have (or did) occur during the migration may be collected (e.g., by migration orchestrator 110) and stored as migration information. Any other types of data what would provide even more transparency to what occurred (e.g., from a technical perspective with regard to the operations of the data processing systems of each provider systems (i.e., 102, 103, 105) and/or the communication system 108, or the like) during the migration could also be collected (e.g., obtained, recorded, or the like) as migration information 166.

Data migration transcript 168 may be a transcript (or the like) generated by migration orchestrator 110 to provide a record (e.g., a plan, a blueprint, a guideline, a set of instructions, or the like) for storing information to be used (e.g., executed) by instances of the migration orchestrator 110 during the migration of data from one data provider to another (e.g., from the source provider system 102 to the destination provider systems 103 of FIG. 1A). Additional details regarding the data migration transcript 168 is discussed below in reference to FIG. 1D.

While FIG. 1C is illustrated as including a limited number of specific data being stored in storage 160, fewer, additional, and/or different types of data may be stored in storage 160 than those illustrated therein. For example, in addition to all of the data shown in FIG. 1C, the storage 160 may store other types of data such as telemetry data of the data processing system 140.

Figure 1D:
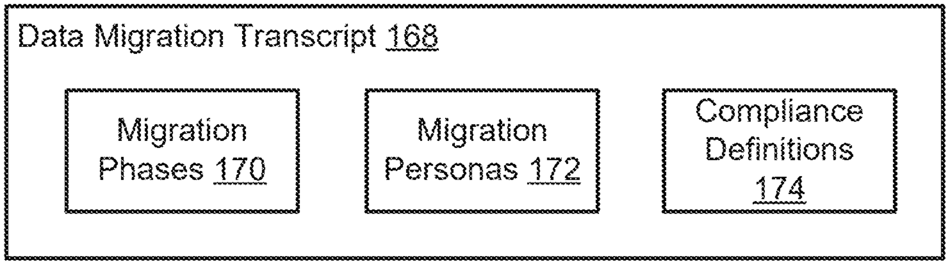
FIG. 1D shows a block diagram of a data migration transcript in accordance with one or more embodiments.

Turning now to FIG. 1D, a diagram illustrating an example data migration transcript 168 in accordance with an embodiment is shown. As shown in FIG. 1D, the data migration transcript 168 may include at least migration phases 170, migration personas 172, and compliance definitions 174.

As discussed above in reference to FIG. 1C, the data migration transcript may be a record of the migration of data between data providers. Said another way, the transcript may include all information associated with the before, during, and after processes of the migration as a central ledger (e.g., record) used to not only instruct the provider systems what to do for the migration (e.g., in the form of a migration plan, migration instructions, or the like) but also to record (e.g., in the form of generating migration records, or the like) everything associated with the start to end of the migration.

In embodiments, migration phases 170 may include any of the phases (e.g., migration phases) discussed in reference to migration information 166 of FIG. 1B. Migration personas 172 may be derived from persona information 164 of FIG. 1B and may include persona information of all actors/personas involved during a migration. Compliance definitions 174 may be derived from data migration standards 162 and may include any criteria and/or factors for each of the migration phases and/or any terms and specific definitions (e.g., legal terms associated with the EU Data Act, or the like) that are necessary to be associated with each migration phase for the migration to be compliant with one or more set of (legal or non-legal) restrictions and policies. For example, for the EU Data Act, compliance definitions 174 such as "entrance criteria", "initiator", "action taken", "exit criteria", and/or "deliverables" may be used.

In embodiments, data migration transcript 168 may also include a set of orchestrator instantiation instructions (e.g., in the form of deployable executing software or the like) (not shown in FIG. 1C) that causes any of the provider systems (i.e., 102, 103, 105) not already deploying (e.g., executing, running, hosting, or the like) a migration orchestrator 110 to deploy (e.g., execute, install, host, run, or the like) an instance of the migration orchestrator 110.

Any of the other information and/or data discussed above in reference to FIGS. 1A-1C (e.g., telemetry data, migration activity data, or the like) may also be included as part of data migration transcript 168 without departing from the scope of embodiments disclosed herein.

Figure 2A:
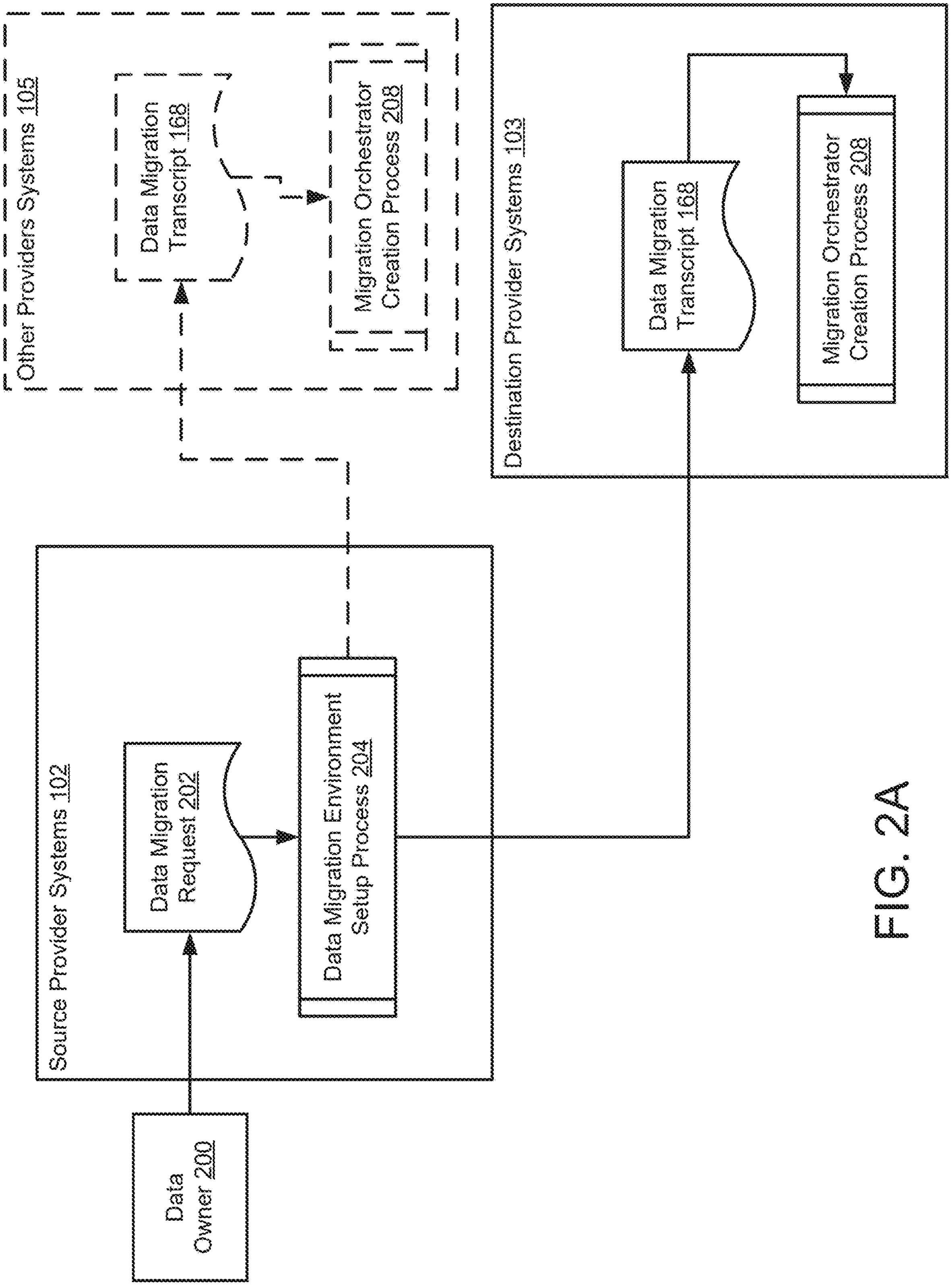
FIGS. 2A and 2B show data flow diagrams in accordance with one or more embodiments.
Figure 2B:
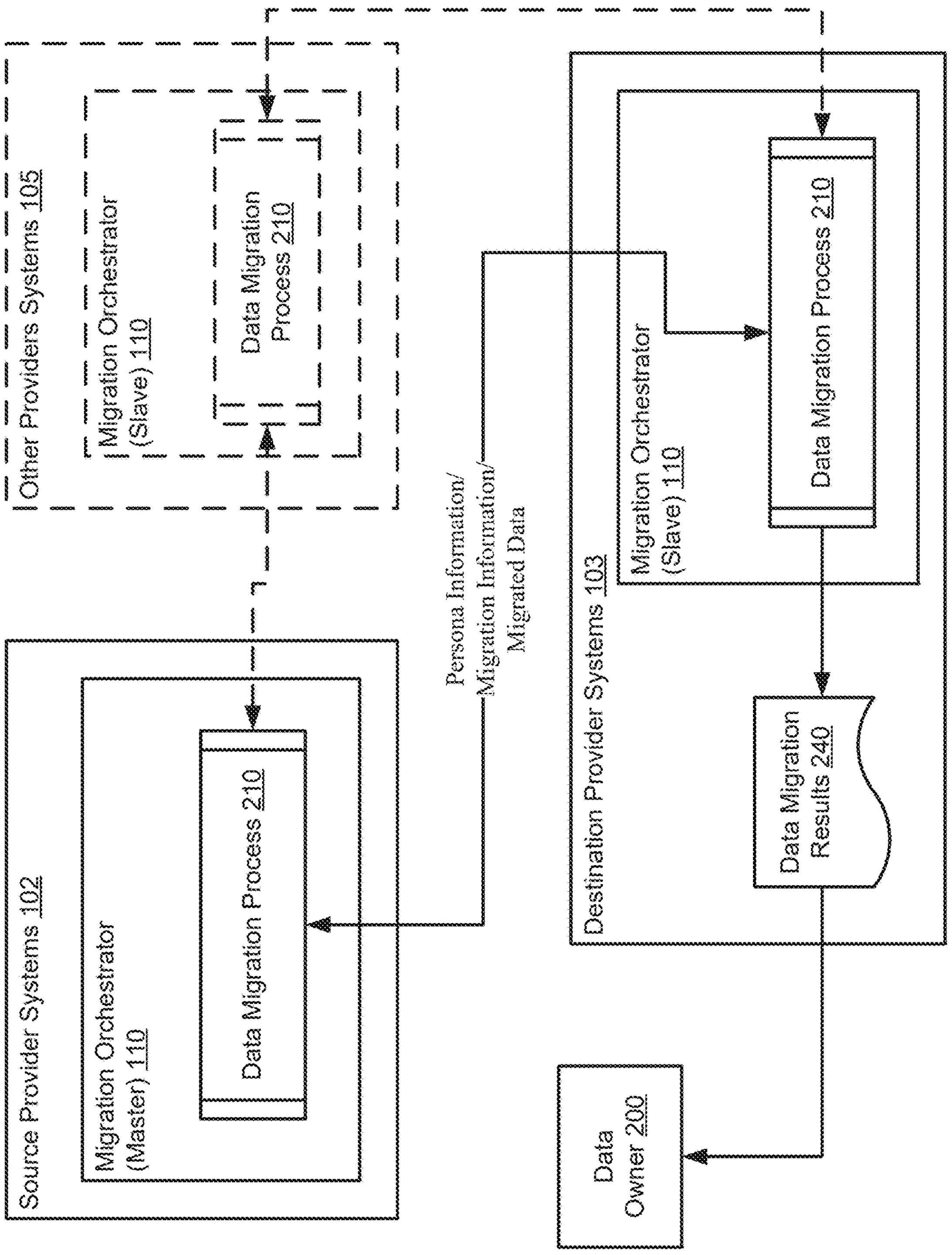

To further clarify embodiments disclosed herein, data flow diagrams in accordance with embodiments disclosed herein are shown in FIGS. 2A and 2B. In the data flow diagram of FIGS. 2A and 2B, flows of data and processing of data are illustrated using different sets of shapes. A first set of shapes (e.g., 202, 168, 240, etc.) is used to represent data structures (e.g., files, documents, data packets, or the like), a second set of shapes (e.g., 204, 208, 210, etc.) is used to represent processes performed using and/or that generate data, and a third set of shapes (e.g., 200, 102, 103, 105, etc.) is used to components and/or devices that perform (e.g., execute) the processes shown using the second set of shapes.

FIGS. 2A and 2B show a data migration process of embodiments disclosed herein.

Starting with and as shown in FIG. 2A, source provider systems 102 may obtain (e.g., receive) data migration request 202 from data owner 200 (e.g., a customer of an operator of source provider systems 102).

In embodiments, data migration request 202 may include any information necessary for source provider systems 102 to understand the data owner 200's request to migrate data/data services from source provider systems 102. For example, data migration request 202 may include, as a minimum, at least: (i) information regarding destination provider systems 103 to which the data/data services are to be migrated and/or regarding any other providers systems 105 that may be involved during the migration; and (ii) an indication of which data/data services are to be migrated (also referred to herein as "target migration data," which is used to collectively refer to data and data services).

Other requirements and/or specifications required by data owner 200 such as a timing of the migration, a required completion data, any migration related policies and/or preferences of the data owner 200, or the like may also be included in data migration request 202 without departing from the scope of embodiments disclosed herein.

Upon obtaining data migration request 202, source provider systems 102 may perform data migration environment setup process to configure (e.g., instantiate, create, or the like) migration orchestrator 110, if one is not already configured. The migration orchestrator 110 may be configured only based on: (i) computing protocols and configurations of (e.g., the operator of) the source provider systems 102; and (ii) any policies and/or preferences included in data migration request 202. Said another way, the migration orchestrator 110 of source provider systems 102 may not be configured (e.g., set up, instantiated, created, or the like) to be compatible or to observe any computing protocols and configurations of destination provider systems 103 (and of other providers systems 105 if any are involved with the migration).

Alternatively, the orchestrator 110 of source provider systems 102 may attempt to collect persona information (e.g., 164, of FIG. 1C) of the destination provider systems 103 in an attempt to configure a migration orchestrator 110 that also takes into consideration the computing protocols and configurations of destination provider systems 103 (e.g., for the migration orchestrator 110 and/or any part of data migration transcript to also be compatible with the destination provider systems 103).

As part of data migration environment setup process 204, migration orchestrator 110 of the source provider systems 102 may also generate a data migration transcript (e.g., 168, FIGS. 1C and 1D) for the requested migration and include any much information as source provider systems 102 has access to within the data migration transcript. In embodiments, the data migration transcript 168 may include orchestrator instantiation instructions (e.g., in the form of deployable executing software). In embodiments, the data migration transcript 168 may also advantageously include information and/or instructions based on one or more legal restrictions and policies (e.g., the EU Data Act) to which the user is unaware. For example, the migration orchestrator 110 of source provider systems 102 may parse data migration standards 162 for any applicable (legal or non-legal) standards to be used as a basis for creating/generating data migration transcript 168 (or be configured to automatically apply one or more of the standards during creation/generation of data migration transcript 168).

In embodiments, the migration orchestrator 110 of source provider systems 102 may be configured as a master instance with control over all subsequently configured instances (e.g., on the destination provider systems 103 and/or the other providers systems 105) of the migration orchestrator 110.

Once data migration transcript 168 has been generated by migration orchestrator 110 of the source provider systems 102, the migration orchestrator 110 of the source provider systems 102 (as further part of data migration environment setup process 204) transmits copies to the data migration transcript 168 to all actors/personas involved with the migration. In the example shown in FIG. 2A, the actors/persons involved are the source provider systems 102 and the destination provider systems 103 with the other providers systems 105 being an optional (as shown in broken lines) party.

In embodiments, instead of providing the complete (e.g., full) data migration transcript 168, the migration orchestrator 110 of the source provider systems 102 may first provide only the migration orchestrator instantiation instructions to the other actors/personas, and then subsequently provide the data migration transcript 168 once instances of the migration orchestrator are instantiated (e.g., running, executing, or the like) on the systems of the other actors/personas.

In embodiments, such data migration transcript 168 and/or the migration orchestrator instantiation instructions may be provided (e.g., transmitted) from the source provider systems 102 to the destination provider systems 103 without the source provider systems 102 first receiving consent from the destination provider systems 103 (and any involved optional other providers systems 105) to send these components to the destination provider systems 103 (and any involved optional other providers systems 105). As another example, the data migration transcript 168 and/or the migration orchestrator instantiation instructions may be sent to the destination provider systems 103 without first allowing the destination provider systems 103 (and any involved optional other providers systems 105) to first validate and/or verify an integrity (e.g., a safety) of the data migration transcript 168 and/or the migration orchestrator instantiation instructions.

Upon obtaining the data migration transcript 168 and/or the migration orchestrator instantiation instructions, the destination provider systems 103 (and any involved optional other providers systems 105) may (e.g., using hardware resources 142 or the like) perform migration orchestrator creation process 208 to execute the migration orchestrator instantiation to instantiate (e.g., host, configure, create, generate, or the like) an instance of the migration orchestrator 110. Because the migration orchestrator 110 instantiated may not be compatible with destination provider systems 103, the destination provider systems 103 is forced to adapt (e.g., by creating new process, configuration, protocols, or the like) to adapt to the configuration of the instantiated instance of the migration orchestrator 110. For example, the destination provider systems 103 may be forced to generate one or more security protocols for protecting an integrity of the destination provider system based on a configuration of the instance of the migration orchestrator 110.

In embodiments, rather than instantiating a full copy of the migration orchestrator 110, the destination provider systems 103 (and any involved optional other providers systems 105) may only install and execute a client (e.g., an agent, an application programming interface (API), a service instance, or the like) of the migration orchestrator 110 hosted on source provider systems 102 that would allow the destination provider systems 103 (and any involved optional other providers systems 105) to communicate with the migration orchestrator 110 hosted on source provider systems 102 to cooperatively complete the migration based on the data migration transcript 168. This allows the migration orchestrator 110 to be provided as a migration orchestrator as-a-service (MOaaS) with respect to the destination provider systems 103 (and any involved optional other providers systems 105).

Turning now to FIG. 2B, once instances of migration orchestrator 110 are running (e.g., executing) on all actors/personas involved in the migration associated with data migration request 202, all of these instances of migration orchestrator 110 cooperatively execute the instructions included in data migration transcript 168 (e.g., as part of data migration process 210) to complete (e.g., fulfill) the data migration request 202.

More specifically, as part of the data migration process 210, each actor/persona involved with the migration initiated by data migration request 202 may execute any phases (e.g., migration phases as discussed in reference to FIG. 1C) that lists (e.g., specifies) the actor/persona as an initiator of one or more of the phases. By having instances of the migration orchestrator 110 cooperatively migrate the data based on the information included in data migration transcript 168, the migration can advantageously be performed in a seamless and streamlined process that is also fully compliant with any legal restrictions and policies (e.g., the restrictions and policies of the EU Data Act) while also preventing and/or reducing any data integrity, security, and regulatory adherence related risks.

During said cooperative migration between the instances of the migration orchestrator 110 executing on each actor/persona, the instances of the migration orchestrator 110 may exchange any of the persona information (e.g., 164, FIG. 1C), migration information (e.g., 166, FIG. 1C), and/or data migration standards (e.g., 162, FIG. 1C) stored locally by each actor/persona with one another to further enhance the data migration transcript 168 (e.g., by the main/master instance of the migration orchestrator (if a master-slave relationship is set up) or any of the instances of the migration orchestrator and then subsequently redistributed to the other instances of the migration orchestrator if all instances have equal levels of authority).

Such cooperative migration is performed until the data is fully migrated (e.g., the data migration request 202 is completed). Completion of the data migration request 202 may be based on, for example, completion of all of the phases included in data migration transcript 168. Additionally, as the actors/personas are performing and completing the data migration, any migration related data collected, observed, obtained, or the like by any of the actors/personas may be added into the data migration transcript 168 (e.g., by any of the instances of the migration orchestrator 110) to paint (e.g., provide) a complete and transparent picture for the migration associated with the data migration request 202.

Once the data migration request 202 is completed, the destination provider systems 103 (and/or the source provider systems 102) may generate data migration results 240 that are subsequently provided (e.g., transmitted) to data owner 200 to notify data owner 200 of the completion.

In some embodiments, the data migration results 240 may include a full copy of the (updated) data migration transcript 168 that includes all information (e.g., records) associated with the start till end of the data migration request 202. In other embodiments, the data migration results 240 may include a summarized (e.g., truncated) version of all information (e.g., records) within the data migration transcript 168. Yet in other embodiments, the data owner 200 may be provided (e.g., as part of data migration results 240) both versions (e.g., full and truncated) of the data migration transcript 168.

In embodiments, once the data migration request 202 has been completed (e.g., the migration of all target migration data is completed), all of the actors/personas involved with the data migration may decommission (e.g., deactivate, delete, or the like) their respective migration orchestrator 110 instance from their respective data processing systems.

Any of the processes illustrated using the second set of shapes (shown in FIGS. 2A-2B and 5A) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes. Any of the processes illustrated using the second set of shapes (shown in FIGS. 2A-2B and 5A) may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first set of shapes (shown in FIGS. 2A-2B and 5A) may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B and 5A may perform various methods for machine generated data conversion using an on-device idle NPU resource utilization process. FIG. 3 illustrates an example of a method that may be performed by the components of FIGS. 1A-2B. For example, any of the data processing systems making up any of the provider systems (e.g., 102, 103, 105 of FIG. 1A) may perform all or a portion of the methods. In the diagrams discussed below and shown in FIG. 3, any of the operations may be repeated, performed in different orders, and/or performed in parallel with or in a partially overlapping in time manner with other operations.

Starting at Operation 300, and as discussed above in reference to FIGS. 1C-2B, a source provider system may obtain (e.g., via a first migration orchestrator of the source provider system), a data migration request.

In embodiments, the data migration request may include at least target migration data and information regarding a destination provider system. The target migration data may be managed and/or stored at the source provider system.

At Operation 302, and as discussed above in reference to FIGS. 1C-2B, the first migration orchestrator of the source provider system may generate a data migration transcript based at least on the data migration request (and/or any or all of the other information and data discussed above in reference to FIGS. 1C-2B).

At Operation 304, and as discussed above in reference to FIGS. 1C-2B, the data migration transcript is provided to the destination provider system. In embodiments, upon receiving the data migration transcript, the destination provider system may be caused to instantiate (e.g., create, run, execute, or the like) an instance of the migration orchestrator as a second migration orchestrator.

In embodiments, the data migration transcript may also be provided to any other relevant other providers systems (e.g., 105, FIG. 1A) where the same process (e.g., instantiation of an instance of the migration orchestrator) will also occur.

At Operation 306, and as discussed above in reference to FIGS. 1C-2B the first migration orchestrator and the second migration orchestrator (and any other instantiated migration orchestrators as a result of a distribution of the data migration transcript by the source provider system to all involved actors/personas for completion of the data migration request) may cooperatively use the data migration transcript to fulfill (e.g., complete) the data migration request.

In embodiments, through use of the data migration transcript and the cooperation between the instances of the migration orchestrator, the data migration request may advantageously be performed in a seamless and streamlined process that is also fully compliant with any legal restrictions and policies (e.g., the restrictions and policies of the EU Data Act) while also preventing and/or reducing any data integrity, security, and regulatory adherence related risks.

The process of FIG. 3 may end following Operation 306.

As noted above, embodiments disclosed herein are directed to the migration of data and/or date services between different data and/or data service providers. As such, unless specifically noted otherwise (e.g., unless specifically noted that only one of data or data services is specifically being migrated) reference to the word "data" may also include reference to "data services," and vice versa.

Additionally, although the migration orchestrator 110 is described as being installed (e.g., hosted) within data processing systems of respective provider systems, embodiments disclosed herein are not limited to such a configuration. In particular, the migration orchestrator 110 may be configured as its own device (e.g., in the form of a migration orchestrator server or the like) separate from the data processing systems of the respective provider systems and be connected to the data processing systems of the respective provider systems via communication system 108 of FIG.

1A. With such a configuration, the migration orchestrator 110 may be separately managed by one of the provider systems (e.g., source provider systems 102) (or be jointly managed by two or more of the provider systems). With this configuration, the migration orchestrator 110 would still cause all provider systems to which data migration templates are distributed to instantiate (e.g., install, execute, run, or the like) instances (e.g., full instances, partial service/client instances, or the like) of the migration orchestrator 110 (without or without first obtaining consent for such instantiation and/or distribution of the data migration templates from the respective provider systems). In this configuration, the migration orchestrator server will be used as a central server for providing the MOaaS to all of the provider systems during migration of data between these systems.

Any of the components illustrated in FIGS. 1A-3 and 5A-6 may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system-on-a-chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth® transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

In embodiments, the migration of the data (e.g., between source provider systems 102 to destination provider systems 103 and through any number of other providers systems 105) may be further protected using security vouchers containing shared secrets (e.g., using a Shamir secret sharing (SSS) schema, or the like).

In particular, conventionally, if someone (e.g., a malicious third party or the like) possesses or comes into possession (through legitimate or illegitimate ways) an encryption key, migration data that was encrypted using such encryption key may be accessed by this individual/entity (e.g., in a situation where such access may be outside the scope of what the original involved actors/personas may not have authorized or agreed-upon). Indeed, today, data supply chains lack control mechanisms to ensure that data (e.g., migrated data or the like) securely reaches an intended endpoint. Even with encryption, data may be accessed outside the predefined flow if someone possesses the key, posing compliance and security risks. While contract agreements define the data flow, deviations from this flow can lead to breaches, and end-users cannot independently govern these flows. In particular, contractual agreements between the source, destination, and third-party data providers outline the data flow between geographical locations, and any deviation may result in breaches of contract or regulation. Embodiments disclosed herein advantageously provide an improved security and control method that prevents such breaches. Thus, an unconventional technical solution has been sought out to validate data authenticity throughout the migration process, with an external authority overseeing it to ensure compliance and security.

In view of the need for such an unconventional technical solution to address the above identified technical problem, implementation of an additional layer of security (e.g., via a control mechanism of embodiments disclosed herein directed to the security vouchers) that enforces data availability only at approved final (or intermediate) destinations of a migration advantageously provides improved security (and even regulatory compliance) during the data migration process.

In particular, embodiments disclosed herein leverage the use of a voucher (e.g., any form of cryptographic messages, artifacts, or the like containing essential information and credentials that can be used by computing devices and systems to authenticate and securely perform one or more required tasks). For example, vouchers similar to those used in FIDO Device Onboard (FDO) schemas may be utilized. Essentially, the voucher may act as proof that a particular device (e.g., data processing system) belongs to a particular owner (e.g., any of the owners and operators of the providers systems 102, 103, 105 or management system), and be used for trusted data transfer between these provider systems.

To further clarify the usage of such vouchers by embodiments disclosed herein, a data flow diagram in accordance with one or more embodiments is provided. In the data flow diagram of FIG. 5A, flows of data and processing of data are illustrated using different sets of shapes. A first set of shapes (e.g., 504, 503, 510, 514, 508, etc.) is used to represent data structures (e.g., files, documents, data packets, or the like), a second set of shapes (e.g., 506, 512, etc.) is used to represent processes performed using and/or that generate data, and a third set of shapes (e.g., 102, 110A, 110C, 110B, 103, etc.) is used to components and/or devices (including computing environments, programs, virtual systems/devices, or the like implemented using these components and/or devices) that perform (e.g., execute) the processes shown using the second set of shapes.

As shown in FIG. 5A, a migration orchestrator 110C may be implemented as an external system (e.g., to source and destination provider systems 102 and 103) that controls (e.g., manages) a data migration as a MOaaS (as discussed above in reference to FIGS. 1A-2B). Said another way, the MOaaS migration orchestrator 110C may manage the operations of migration orchestrator 110A and migration orchestrator 110B of the source and destination provider systems 102 and 103 (along with any other migration orchestrators instantiated by any involved other provider systems 105), respectively, to ensure that these instances of the migration orchestrators are performing the data migration in a manner that adheres to all requirements agreed-upon by all involved actors/personas.

In embodiments, migration orchestrator 110C may generate a universally unique identifier (UUID) for each involved actors/personas. In this example of FIG. 5A, a UUID may be generated for source provider systems 102 and another (different) UUID may be generated for destination provider systems 103 by migration orchestrator 110C. In embodiments, the migration orchestrator 110C may provide the generated UUID to the respective actor/persona. Alternatively, the migration orchestrator 110C may keep these UUIDs a secret by securely storing them (e.g., in a secured portion of a storage device configured as a vault, or the like) within a data processing system configured to execute (e.g., host) the migration orchestrator 110C.

During any part of the data migration process where data will be exchanged between any of the actors/personas, the migration orchestrator 110C may utilize these generated UUIDs to implement a secure and controlled data transfer protocol using vouchers (e.g., security vouchers).

In particular, as shown in FIG. 5A, assume that FIG. 5A depicts a point in time after the source provider systems 102 has received a data migration request 202 (see FIG. 2A) from a data owner, has completed data migration environment setup process 204 (see FIG. 2A), and is ready to transmits data migration transcript 168 to destination provider systems 103 as migration data 503. Migration orchestrator 110C may, before the migration data 503 is transferred to destination provider systems 103) provide a security voucher 504 to migration orchestrator 110A of source provider systems 102.

In embodiments, security voucher 504 may include at least, but is not limited to: (i) a cryptographical key (as part of a cryptographical key pair or the like) or other similar cryptographical data; (ii) and instructions to cause migration orchestrator 110A to use the cryptographical key included in the security voucher to encrypt, secure (or validation purposes), or the like, the migration data 503 (e.g., as part of secured migration packet generation process 506). In embodiments the security voucher 504 may be a one-time voucher.

In embodiments, before using the security voucher 504, migration orchestrator 110A may first (e.g., as part of secured migration packet generation process 506) verify/validate that the security voucher was indeed generated by migration orchestrator 110C. This verification/validation may be conducted in any form and may utilize additional data (e.g., ownership data, authentication data, or the like) that is further included in security voucher 504 that can be used by migration orchestrator 110A to verify/validate that the security voucher was indeed generated by migration orchestrator 110C.

As further part of secured migration packet generation process 506, the migration orchestrator 110A of source provider systems 102 may package voucher metadata (e.g., including the cryptographical key or other similar cryptographical data) of the security voucher 504 with the migration data 503 to generate (e.g., obtain) secured migration packet 508. Secured migration packet 508, once generated, may be provided to destination provider systems 103.

At any time before, during, or after the transfer of secured migration packet 508, migration orchestrator 110C may provide secret voucher data 510 to destination provider systems 103 (namely, to migration orchestrator 110B of destination provider systems 103). In embodiments, secret voucher data 510 may utilize a secret sharing (SS) schema such as SSS or the like, and may contain, for example: a secret piece of data (e.g., a secret shard or the like) that is required to be combined with another piece of data to generate (e.g., obtain, reconstruct, or the like) a cryptographical key or the like). In embodiments, the secret piece (or pieces) of data (e.g., the secret shard(s)) may be made up of any type and/or format of data and include any data that follows one or more predefined secret shard(s) generation rules defined and/or set by an administrator (and/or operator) of migration orchestrator 110C. Additionally, these one or more predefined secret shard(s) generation rules may have been evaluated (e.g., validated) and agreed-upon by all actors/personas involved during a migration. Alternatively, for additional security and control purposes, the one or more predefined secret shard(s) generation rules may only be known to migration orchestrator 110C.

For example, in the example of FIG. 5A, the secret voucher data 510 may include a secret shard that, when combined with one or more pieces of information included in secured migration packet (e.g., a specific identified portion of data migration transcript 168, a UUID of destination provider systems 103, or the like), generates a corresponding cryptographic key (e.g., the opposite key pair of) the cryptographic key included in security voucher 504 that was used to encrypt, secure, or the like the migration data 503. Said another way, assume that the cryptographic key (or other type of cryptographic and/or verification data) included in security voucher 504 is key #1 that can only be unlocked (and/or validated) using a key #2. Key #2 may be generated using the secret shard(s) included in secret voucher data 510 when the secret shard(s) are combined (as instructed in secret voucher data 510) with one or more portions of data making up secured migration packet 508.

Upon obtaining the corresponding cryptographic key (i.e., key #2), for example through secured migration packet validation process 512), migration orchestrator 110B may use this key #2 to validate (and/or verify, decrypt, or any combination thereof) secured migration packet 508 to obtain validated migration packet 514. Because only the destination provider systems 103 is provided with the secret required to validate and/or decrypt secured migration packet 508, such secured migration packet 508 can be advantageously transferred to destination provider systems 103 with improved control and security over the transfer.

In embodiments, such a voucher security validation/verification schema may be applied to every hop that the migration data 503 experiences before reaching the destination provider systems 103. More specifically, such voucher security validation/verification schema may be executed at every other providers systems 105 that the migration data 503 may have to travel through (e.g., for additional data processing purposes, or the like) before being ultimately received by the migration orchestrator 110B of the destination provider systems 103.

Additionally, although the example of FIG. 5A is shown using migration orchestrator 110C as an independent system providing MOaaS to all involved actors/personas of a migration, embodiments disclosed herein are not limited to such a configuration. For example, a separate and independent migration orchestrator 110C may not be needed and the migration orchestrator 110A of source provider systems 102 (configured as a master instance over all other instances of the migration orchestrators instantiated at the other actor/persona locations) may take on the role and operations of the migration orchestrator 110C.

An implementation example of the secret sharing schema of embodiments disclosed herein is shown in FIG. 5B. As shown in FIG. 5B, an MOaaS (e.g., migration orchestrator 110C of FIG. 5A) may generate two identification keys (i.e., identification key #1 and identification key #2) for use in a specific, one-time use security voucher (e.g., 504, FIG. 5A) involved data transfer. Identification key #1 will be included in security voucher 504 provided to an originating source (e.g., source provider systems 102 in the example of FIG. 5A) of the data transfer.

As further shown in FIG. 5B, identification key #2 will be broken up into two parts (i.e., SSS shard #1 or (key #A) and SSS shard #2 or (key #B)). In embodiments, key #A may be made up of one or more pieces of data and/or information included in the data to be transferred to the receiving device (i.e., destination). In embodiments, key #A may also be included in the security voucher 504 provided to the originating source.

The originating source (i.e., Source here in FIG. 5B) may encrypt and/or secure the data to be transferred to Destination using Key #1 while including Key #A as part of the data that is being transferred. Key #B, the second shard needed to be combined with the first shard key #A to reconstruct Key #2 may be provided by MOaaS to the Destination.

At the Destination and upon receiving the secured migration packet (e.g., secured transferred data and 508 of FIG. 5A), Destination may use obtained Key #B and hidden Key #A in the secured migration packet to reconstruct Key #2, which may then be used by Destination to decrypt and/or secure the secured migration packet by cryptographically verifying Key #2 with Key #1. For example, assume that the secured migration packet is secured by Key #1, Key #2 (in conjunction with Key #1) to determine whether the data in the secured migration packet has been tampered during the transfer, or the like). As another example, Key #2 may be used with Key #1 to verify that the data in the secured migration packet is the data that should be received by Destination.

In embodiments, although the specific example of the SS and SSS schema is discussed above with reference to FIGS. 5A and 5B, embodiments herein are not limited to such a specific schema and other similar cryptographical, security, and/or encryption based protocols and/or schemas may also be used without departing from the scope of embodiments disclosed herein.

As a result of the above processes and examples discussed above in FIGS. 5A and 5B, embodiments disclosed herein may provide an unconventional solution directed to a supply chain protection method for data transmission by leveraging flow governance, geographical restrictions, and cryptographic validation. Embodiments disclosed herein may also advantageously provide, but is not limited by: (i) the ability to confirm data access and traceability based on security vouchers; (ii) the ability to control the sender/receiver side of the data; (iii) enhanced and improved security and compliance across the data flow supply chain; and (iv) flow control, geographical restrictions, and protect the data supply chain from unauthorized access.

As discussed above, the components of FIGS. 1A-2B and 5A-5B may perform various methods for machine generated data conversion using an on-device idle NPU resource utilization process. FIG. 6 illustrates an example of a method that may be performed by the components of FIGS. 1A-2B and 5A-5B. For example, any of the data processing systems making up any of the provider systems (e.g., 102, 103, 105 of FIG. 1A) may perform all or a portion of the methods. In the diagrams discussed below and shown in FIG. 6, any of the operations may be repeated, performed in different orders, and/or performed in parallel with or in a partially overlapping in time manner with other operations.

Starting at Operation 600, and as discussed above in reference to FIGS. 5A-5B, a first migration orchestrator (e.g., migration orchestrator 110C of FIG. 5A) may generate a security voucher comprising first cryptographic data.

In embodiments, the first migration orchestrator may be configured as an MOaaS for a data migration process (i.e., a data migration) involving migration of customer data from a source provider system to a destination provider system (and through one or more other providers systems). The source provider system hosting (e.g., executing) a second migration orchestrator and the destination provider system hosting (e.g., executing) a third migration orchestrator.

In embodiments, the second and third migration orchestrator are managed and controlled by the first migration orchestrator.

At Operation 602, and as discussed above in reference to FIGS. 5A-5B, the first migration orchestrator may generate second cryptographic data usable to verify the first cryptographic data.

In embodiments, the first cryptographic data and the second cryptographic data may be a pair of identification keys.

At Operation 604, and as discussed above in reference to FIGS. 5A-5B, the first migration orchestrator may deconstruct the second cryptographic data into at least two secret shards comprising a first secret shard and second secret shard. The first and second secret shards may follow an SSS protocol.

At Operation 606, and as discussed above in reference to FIGS. 5A-5B, the first migration orchestrator may provide the security voucher to a source provider system from which customer data is to be migrated as part of the data migration to the destination provider system.

In embodiments, the security voucher may include instructions for the source provider system to secure migration data to be transferred to destination providers as part of the data migration. The migration data may include data identical to the first secret shard.

At Operation 608, and as discussed above in reference to FIGS. 5A-5B, the first migration orchestrator may provide the second secret shard to the destination provider system (e.g., in the form of secret voucher data 510).

In embodiments, the second secret shard may be provided along with first instructions for the destination provider system to reconstruct the second cryptographic data using the second secret shard and the migration data and second instructions for the destination provider to use a reconstructed one of the second cryptographic data to verify the migration data.

The process of FIG. 6 may end following Operation 608.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for migrating data between provider systems comprising:

generating, by a first migration orchestrator, a security voucher comprising first cryptographic data;

generating, by the first migration orchestrator, second cryptographic data usable to verify the first cryptographic data;

deconstructing, by the first migration orchestrator, the second cryptographic data into at least two secret shards comprising a first secret shard and second secret shard;

providing, by the first migration orchestrator, the security voucher to a source provider system from which customer data is to be migrated as part of a data migration to a destination provider system along with instructions for the source provider system to secure migration data to be transferred to destination providers as part of the data migration, the migration data comprising data identical to the first secret shard; and providing, by the first migration orchestrator, the second secret shard to the destination provider system with first instructions for the destination provider system to reconstruct the second cryptographic data using the second secret shard and the migration data and second instructions for the destination provider system to use a reconstructed one of the second cryptographic data to verify the migration data.

2. The method of claim 1, wherein verifying the migration data comprises verifying the second cryptographic data against the first cryptographic data used to secure the migration data.

3. The method of claim 2, wherein securing the migration data comprises encrypting the migration data using the first cryptographic data and verifying the migration data comprises using the second cryptographic data to decrypt the migration data that is encrypted using the first cryptographic data.

4. The method of claim 3, wherein the first cryptographic data and the second cryptographic data are identification keys.

5. The method of claim 3, wherein the at least two secret shards are generated based on a Shamir Secret Sharing (SSS) protocol.

6. The method of claim 3, wherein the data migration is generated based on a data migration transcript generated for the data migration, and the first migration orchestrator cooperatively performs the data migration along with a second migration orchestrator of the source provider system and a third migration orchestrator of the destination provider system using the data migration transcript as a guideline for the data migration.

7. The method of claim 6, wherein the first migration orchestrator manages and controls operations of the second migration orchestrator and the third migration orchestrator.

8. A non-transitory machine-readable medium having instructions stored therein, which when executed by a processor, cause the processor to perform operations for migrating data between provider systems, the operations comprising:

generating, by a first migration orchestrator, a security voucher comprising first cryptographic data;

generating, by the first migration orchestrator, second cryptographic data usable to verify the first cryptographic data;

deconstructing, by the first migration orchestrator, the second cryptographic data into at least two secret shards comprising a first secret shard and second secret shard;

providing, by the first migration orchestrator, the security voucher to a source provider system from which customer data is to be migrated as part of a data migration to a destination provider system along with instructions for the source provider system to secure migration data to be transferred to destination providers as part of the data migration, the migration data comprising data identical to the first secret shard; and providing, by the first migration orchestrator, the second secret shard to the destination provider system with first instructions for the destination provider system to reconstruct the second cryptographic data using the second secret shard and the migration data and second instructions for the destination provider system to use a reconstructed one of the second cryptographic data to verify the migration data.

9. The non-transitory machine-readable medium of claim 8, wherein verifying the migration data comprises verifying the second cryptographic data against the first cryptographic data used to secure the migration data.

10. The non-transitory machine-readable medium of claim 9, wherein securing the migration data comprises encrypting the migration data using the first cryptographic data and verifying the migration data comprises using the second cryptographic data to decrypt the migration data that is encrypted using the first cryptographic data.

11. The non-transitory machine-readable medium of claim 10, wherein the first cryptographic data and the second cryptographic data are identification keys.

12. The non-transitory machine-readable medium of claim 10, wherein the at least two secret shards are generated based on a Shamir Secret Sharing (SSS) protocol.

13. The non-transitory machine-readable medium of claim 10, wherein the data migration is generated based on a data migration transcript generated for the data migration, and the first migration orchestrator cooperatively performs the data migration along with a second migration orchestrator of the source provider system and a third migration orchestrator of the destination provider system using the data migration transcript as a guideline for the data migration.

14. The non-transitory machine-readable medium of claim 13, wherein the first migration orchestrator manages and controls operations of the second migration orchestrator and the third migration orchestrator.

15. A data processing system, the data processing system comprising:

a central processing unit (CPU); and a memory coupled to the CPU to store instructions, which when executed by the CPU, cause the CPU to perform operations for migrating data between provider systems, the operations comprising:

generating, by a first migration orchestrator, a security voucher comprising first cryptographic data;

generating, by the first migration orchestrator, second cryptographic data usable to verify the first cryptographic data;

deconstructing, by the first migration orchestrator, the second cryptographic data into at least two secret shards comprising a first secret shard and second secret shard;

providing, by the first migration orchestrator, the security voucher to a source provider system from which customer data is to be migrated as part of a data migration to a destination provider system along with instructions for the source provider system to secure migration data to be transferred to destination providers as part of the data migration, the migration data comprising data identical to the first secret shard; and providing, by the first migration orchestrator, the second secret shard to the destination provider system with first instructions for the destination provider system to reconstruct the second cryptographic data using the second secret shard and the migration data and second instructions for the destination provider system to use a reconstructed one of the second cryptographic data to verify the migration data.

16. The data processing system of claim 15, wherein verifying the migration data comprises verifying the second cryptographic data against the first cryptographic data used to secure the migration data.

17. The data processing system of claim 16, wherein securing the migration data comprises encrypting the migration data using the first cryptographic data and verifying the migration data comprises using the second cryptographic data to decrypt the migration data that is encrypted using the first cryptographic data.

18. The data processing system of claim 17, wherein the first cryptographic data and the second cryptographic data are identification keys.

19. The data processing system of claim 17, wherein the at least two secret shards are generated based on a Shamir Secret Sharing (SSS) protocol.

20. The data processing system of claim 17, wherein the data migration is generated based on a data migration transcript generated for the data migration, and the first migration orchestrator cooperatively performs the data migration along with a second migration orchestrator of the source provider system and a third migration orchestrator of the destination provider system using the data migration transcript as a guideline for the data migration.

* * * * *